(No Model.)

E. L. DEVEREAUX.
THILL COUPLING.

No. 546,584. Patented Sept. 17, 1895.

Witnesses
Christopher Nondelink
Ambrose C. Hindman

Inventor.
Eugene L. Devereaux
By Edward Taggart
His Attorney

UNITED STATES PATENT OFFICE.

EUGENE L. DEVEREAUX, OF OWOSSO, MICHIGAN.

THILL-COUPLING.

SPECIFICATION forming part of Letters Patent No. 546,584, dated September 17, 1895.

Application filed February 20, 1895. Serial No. 539,071. (No model.)

*To all whom it may concern:*

Be it known that I, EUGENE L. DEVEREAUX, a citizen of the United States, residing at the city of Owosso, in the county of Shiawassee and State of Michigan, have invented certain new and useful Improvements in Thill or Shaft Couplings for Vehicles, of which the following is a specification.

This invention relates to a new and improved coupling for the shafts or poles of vehicles; and the invention consists in combining with the shaft a spring attachment which is adapted to engage with the clip of the vehicle axle-tree in such a manner that by compressing the springs it may be readily detached; and the objects of my invention are, first, to provide a coupling for the shaft or pole which enables the user to readily attach or detach the shaft or pole from the vehicle; second, to produce a shaft-coupling, which, when attached, will remain securely in place, and which will prevent noise or rattling; third, to combine with the spring attachment a cheap and effective locking device for retaining the coupling in place.

These objects I accomplish by means of the mechanism illustrated in the accompanying drawings, in which—

Figure 1:
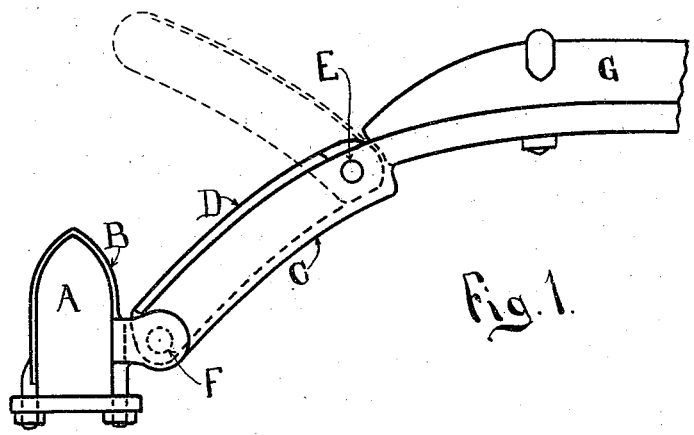
Figure 2:
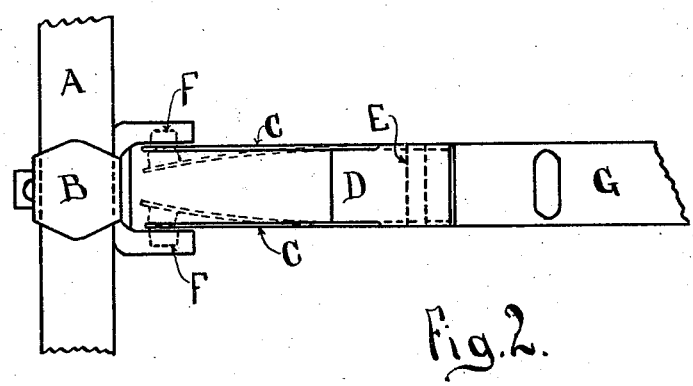

Figure 1 shows a side elevation of an axle-tree with my improved coupling attaching the shaft or thill to the axle-tree clip; and Fig. 2 shows a plan view of the same, with dotted lines showing the position of the spring attachment when the springs are pressed into position to free the shaft from the clip.

Similar letters refer to similar parts throughout both views.

A represents a portion of the front axle-tree of a vehicle.

B represents a clip, of any ordinary construction, provided with ears which support the shaft or thill.

G represents the shaft or thill, constructed in any suitable manner.

C C represent springs, preferably attached securely to the thill in such a manner that the free ends may be compressed or pressed toward each other, as shown by dotted lines in Fig. 2. In the ears are openings, (shown by F F,) which may extend through the ears, but which preferably extend into the ears, as shown in the drawings. In my preferred form I attach a bearing or trunnion to each of the springs C C, which, when the springs are in position to attach the shaft to the clip, engage with openings in the ears, and which, when the springs are pressed together, as shown by the dotted lines in Fig. 2, are removed from the ears and allow the shaft to be readily detached.

E represents a pivot for the locking-piece D. Said locking-piece D, when in locking position, is dropped between the springs C C, retaining the trunnions F F in position within the ears. When the shaft is to be detached, the locking-piece E is turned up into the position shown by the dotted lines in Fig. 1, and the springs C C are compressed together in the position shown by dotted lines in Fig. 2, in which position the shaft can be readily removed. Instead of attaching the trunnions F F to the springs, they may be rigid with or integral with the ears and pass through openings in the ends of the spring; but I prefer the form shown in the drawings, in which the trunnions F F are made rigid with the springs. The locking-piece D is preferably made of such length that when the shaft is in the position it would assume when the same is raised to attach it to the animal the locking-piece would be prevented, on account of its relative position to the axle-tree, from being lifted out of locking position. The locking-piece D may be made of wood or any other suitable material, and may be made of any required form, provided it is of sufficient width to drop into position between the spring and retain the same locked in position to attach the shaft to the clip. The springs C C may be extended or made integral with the metal plate or attachment, whereby the springs are securely attached to the shaft. The clip may be made of any ordinary form and of ordinary material. The springs C C should be made strong enough to make a secure attachment between the shaft and the clip.

My invention is adapted for use in connection with buggies, cutters, and other vehicles, and may be applied to the ordinary carriage-pole, as well as to the thills of a buggy or cutter.

Having thus described my invention, what I claim to have invented, and desire to secure by Letters Patent, is—

1. In a thill coupling the combination with an axle clip and a thill, of the two springs secured to the thill and adapted to engage the inner sides of the clip ears, and a pivotally supported locking piece carried on the thill and adapted to drop into position between the springs to lock and retain the springs in their engagement with the clip and whereby, on lifting the said locking piece, the springs may be pressed together for the purpose of detaching the thill, substantially as described.

2. In a thill coupling, the combination with an axle clip, and a thill having secured thereto a pair of springs adapted to engage the clip ears, one of said parts being provided with trunnions and the other part having recesses or openings to receive the trunnions, of a locking piece pivoted at one end to the thill and adapted to drop between the springs and retain them in a secure engagement with the clip, substantially as described.

In witness whereof I have hereunto set my hand and seal in the presence of two witnesses.

EUGENE L. DEVEREAUX. [L. S.]

Witnesses:
F. W. LAWRENCE,
A. D. WHIPPLE.